United States Patent
Morath

(10) Patent No.: US 7,468,675 B2
(45) Date of Patent: Dec. 23, 2008

(54) DEVICE FOR DETECTING POSITIONS OF A MOVABLE GUIDED PART

(75) Inventor: Erwin Morath, Lauterach (DE)

(73) Assignee: Liebherr-Werk Ehingen GmbH, Ehingen/Donau (DE)

( * ) Notice: Subject to any disclaimer, the term of this patent is extended or adjusted under 35 U.S.C. 154(b) by 79 days.

(21) Appl. No.: 11/197,738

(22) Filed: Aug. 3, 2005

(65) Prior Publication Data
US 2006/0028201 A1    Feb. 9, 2006

(30) Foreign Application Priority Data
Aug. 4, 2004  (DE)  .................. 20 2004 012 223 U
Aug. 25, 2004 (DE)  .................. 20 2004 013 306 U

(51) Int. Cl.
*G08B 21/00*    (2006.01)

(52) U.S. Cl. ............... 340/685; 340/539.1; 340/572.1; 340/686.1; 340/686.2; 340/686.4; 340/686.6

(58) Field of Classification Search ............... 340/539.1, 340/527.1, 572.8, 686.1, 686.2, 686.4, 686.6, 340/686.3
See application file for complete search history.

(56) References Cited

U.S. PATENT DOCUMENTS

| | | | | |
|---|---|---|---|---|
| 6,060,969 A | * | 5/2000 | Hufgard et al. | ............ 335/207 |
| 6,122,329 A | * | 9/2000 | Zai et al. | ............ 375/329 |
| 6,362,738 B1 | * | 3/2002 | Vega | ............ 340/572.1 |
| 6,478,229 B1 | | 11/2002 | Epstein | |
| 6,571,172 B1 | * | 5/2003 | Klement | ............ 701/207 |
| 6,641,042 B1 | | 11/2003 | Pierenkemper et al. | |
| 6,715,602 B1 | * | 4/2004 | Gartland | ............ 198/810.02 |
| 6,943,688 B2 | * | 9/2005 | Chung et al. | ............ 340/572.7 |
| 2003/0035015 A1 | | 2/2003 | Conwell et al. | |

FOREIGN PATENT DOCUMENTS

| | | |
|---|---|---|
| DE | 3242551 | 5/1983 |
| DE | 4425736 | 1/1996 |
| DE | 29710694 U | 9/1997 |
| DE | 10131102 | 1/2003 |
| DE | 10358857 | 7/2005 |
| EP | 0229247 | 7/1987 |
| EP | 0753472 | 1/1997 |

* cited by examiner

*Primary Examiner*—Daryl C Pope
(74) *Attorney, Agent, or Firm*—Alleman Hall McCoy Russell & Tuttle LLP

(57) ABSTRACT

This present application relates to a device for detecting positions of a movably guided part, comprising a proximity sensor which supplies an output signal which is a measure for the distance of an object located in front of the proximity sensor, and further comprising at least one transponder arranged on the movably guided part, the proximity sensor being designed such that the data stored in the transponder can be read out by means of the proximity sensor.

18 Claims, 1 Drawing Sheet

DEVICE FOR DETECTING POSITIONS OF A MOVABLE GUIDED PART

CROSS REFERENCE TO RELATED APPLICATIONS

This application claims priority to German Utility Model Application Ser. No. DE 202004012223.5 filed Aug. 4, 2004, and also claims priority to German Utility Model Application Ser. No. DE 202004013306.7, filed Aug. 25, 2004, both of which are hereby incorporated by reference in their entirety for all purposes.

FIELD

The present application relates to a device for detecting positions of a movably guided part, comprising a proximity sensor which supplies an output signal which is a measure for the distance of an object located in front of the proximity sensor.

BACKGROUND AND SUMMARY

Such a device for detecting positions is known for instance from DE 198 30 981 C1. The proximity sensor disclosed in this reference is used for detecting predefined positions of a movably guided part for instance of a vehicle crane. When extending the lengths of a telescope jib, for instance, the movement of the required hydraulic cylinders must be monitored and controlled, and the position of the bolts for bolting the respective lengths of the telescope jib must be detected. In the known device, the output signal of the proximity sensor is converted into digital output values by means of an A-D converter, and said output values are compared with reference thresholds, an error message being produced when the digital output values lie outside admissible reference thresholds, which is checked by an evaluation unit. In the case of a faulty conversion of the signals in the A-D converter or a faulty matching of the digital output values with reference thresholds, it may occur that no error message is produced, although the proximity switch does not operate correctly. The same is true for the case that the proximity sensor operates incorrectly in so far as independent of the position of the movably guided part always the same output signal is provided, whose digital values lie within a tolerance range.

Therefore, one object is to develop a device as mentioned above such that the functional check of the proximity switch is improved.

This object is solved by a device for detecting positions of a movably guided part by means of a proximity sensor which supplies an output signal which is a measure of the distance of an object located in front of the proximity sensor. The device can furthermore include at least one transponder arranged on the movably guided part, the proximity sensor being designed such that the data stored in the transponder can be read out by means of the proximity sensor. On the basis of the information received from the transponder it can be checked whether the proximity switch operates correctly. A functional check of the proximity switch thus can be effected, for instance, by the method described in DE 198 30 981 C1 and in addition on the basis of the communication between proximity sensor and transponder. In accordance with one aspect, a functional check of the switch thus is effected by means of two different measurement methods. This may increase the safety and degree of diagnostic coverage, whereby a higher safety class can be achieved.

The proximity sensor may be an inductive sensor which operates according to the principle of the damped LC oscillator.

Advantageously, the proximity sensor includes an oscillating circuit and a processor controlling the oscillating circuit, by means of which processor the oscillating circuit can be operated with a first frequency, at which the proximity sensor is used for detecting a position, and with a second frequency or modulated frequency, at which the proximity sensor is used for communication with the transponder. Inductive proximity sensors include a harmonic oscillator, which generates a high-frequency alternating field by means of a sensor coil which is part of the oscillating circuit. When metal enters the alternating field of the sensor coil, energy is withdrawn from the system by generating eddy current, so that the amplitude of oscillation becomes smaller. A resulting change in current is evaluated in a subsequent electronic unit. There is generated a continuous output signal, which is a measure for the distance of the object from the measurement surface of the sensor. In accordance with one embodiment, the proximity sensor furthermore is used for communication with the transponder. For this purpose, the proximity sensor can be operated at a second frequency or a frequency modulated with respect to the first frequency, or different from the first frequency. This provides for a communication between proximity sensor and transponder, this communication being used for reading out data from the transponder and furthermore, in accordance with one aspect, for writing data into the memory of the transponder.

Accordingly, it is provided in accordance with a further aspect that the transponder is both readable and writable. The transponder can be an active or passive transponder. For instance, the transponder can be designed as an inductively acting transponder.

It is particularly advantageous when the data stored in the transponder concerns the movably guided part. The data can for instance be identification numbers, serial numbers, quality data and/or data concerning the manufacturer.

A particularly advantageous application results from the fact that the data stored in the transponder may comprise data concerning the history of the movably guided part, in particular the collective loads allocated to the part. In this way it is possible to store and scan the collective loads allocated to the length of a crane jib, which is possible as a result of the allocation of the transponder(s) to a movably guided part. In the case of used devices, for instance used cranes, it is thus possible to find clues as to the collective loads allocated to the respective part by means of the data stored in the transponders, which clues form the basis for the determination of the residual value of the device.

In accordance with a further aspect, a first evaluation unit is provided, which compares the output values of the proximity sensor or values derived therefrom with reference values. Furthermore, a second evaluation unit is provided, which compares the transponder response signal with a reference signal, an error message being produced when the difference between the output values and the reference values exceeds a limit value or the transponder response signal does not correspond to the reference signal. The first and second evaluation units can be one and the same component.

In principle, it is possible that the evaluation unit constitutes a component which is suitably connected with the proximity switch. It is likewise possible that the evaluation is effected in the proximity switch itself, so that the proximity switch accordingly is designed as an intelligent component. In accordance with a further aspect, said first or second evaluation unit or also both evaluation units can accordingly be integrated in the proximity switch.

It can furthermore be provided that the values derived from the output values of the proximity sensor are digital output values, and that hence an analog-to-digital converter is provided, which converts the output values of the proximity sensor into digital values.

The proximity sensor may be connected with a control unit via a bus. It is particularly advantageous when the bus address is automatically allocated by the transponder. Furthermore, an advantageous aspect consists in that the proximity switch is automatically allocated to a mounting place on the basis of the data stored in the transponder. In this way it is possible to provide proximity sensors or switches at the desired mounting places, which at first have not yet been allocated to a certain mounting position and to which parameters have not yet been allocated correspondingly. Upon mounting the proximity switches, the associated transponder is identified, and the proximity switch is automatically allocated to the corresponding mounting place. From a central control unit, the associated parameters of the proximity switch or sensor can be read out and be allocated to the same, such as the switching distance, the switching threshold, and other functions. The same is true for the automatic allocation of the bus address by the transponder. Accordingly, it is also possible to first of all, not allocate an address to the proximity sensor and perform an automatic allocation of the bus address by means of the transponder.

It is also possible in principle that the bus address is allocated such that the transponder is scanned or read out by means of the proximity switches. In this case, the proximity switches have a default address. It is also possible and particularly advantageous to perform a direct allocation. In this case, the proximity switches have no default address, and the transponders are read out independently.

BRIEF DESCRIPTION OF THE FIGURE

Further details and advantages will be explained with reference to an embodiment illustrated in the drawing, in which.

DETAILED DESCRIPTION

Figure 1:
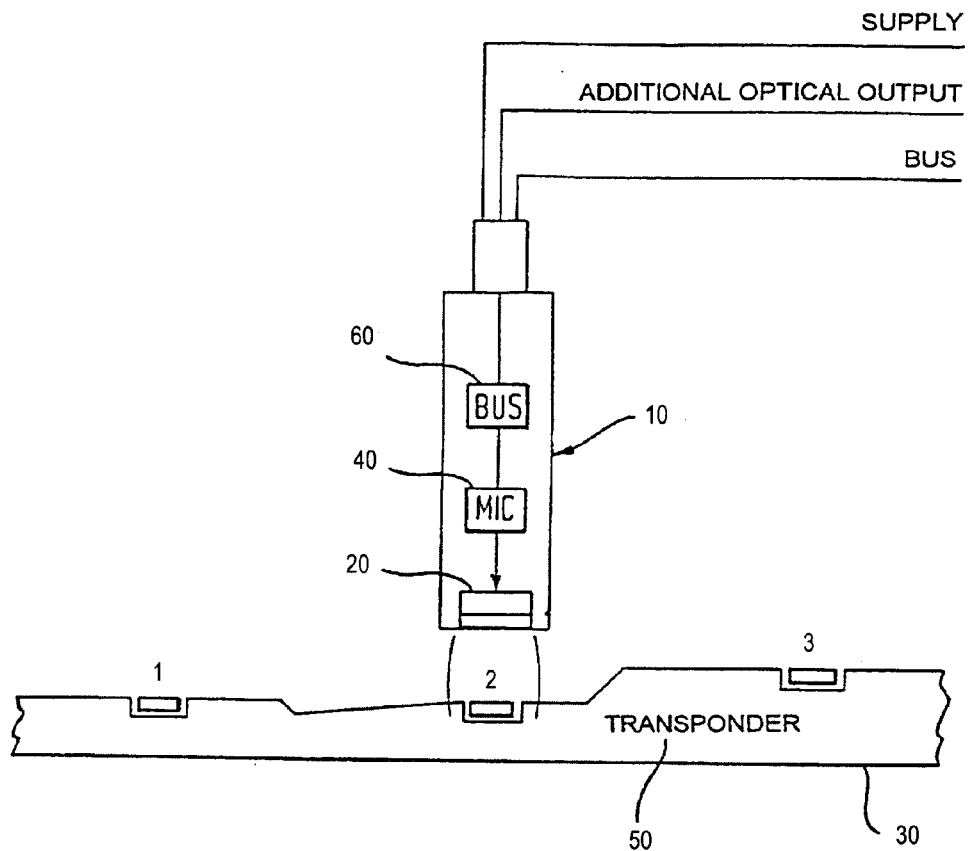
FIG. 1 shows a schematic representation of a proximity sensor and of the switching part with transponder and FIG. 2 shows a method for detecting positions of a movably guided part of a vehicle crane.

As shown in FIG. 1, the proximity switch 10 includes a proximity sensor 20, which operates according to the principle of the damped LC oscillator. In the sensor coil, which is part of the LC oscillating circuit, the harmonic oscillator generates a high-frequency alternating field. When the switching part 30 used as damping surface is introduced into the alternating field of the sensor coil, energy is withdrawn from the system by generating eddy current, so that the amplitude of oscillation becomes smaller. The resulting change in current is evaluated in a subsequent electronic unit.

The switching part 30 shown in the drawing has three preferential positions or elements 1, 2 and 3. In the drawing, the proximity sensor 20 is shown in a position in which the distance of the measurement surface of the sensor 20 from the element 2 is determined. The elements 1, 2 and 3 can include the transponder(s). It is also possible to arrange the transponder(s) on the switching part 30 in addition to the elements 1, 2 and 3.

Within its range of measurement, the proximity sensor 20 provides a continuous output signal, which serves as a measure for the distance of an object located in front of the proximity sensor 20. It serves to detect predefined positions of the movably guided switching part 30. The switching part 30 is designed such that the output signal is changed at least in the predefined positions.

On the switching part 30, a transponder 50 is provided, which stores data concerning the switching part 30. These data can for instance be data concerning the manufacturer, the identification number, the serial number, quality data and/or also collective loads allocated to the part.

On the switching part 30, one or more transponders 50 can be arranged.

As is also shown in FIG. 1, the sensor 20 is connected with the processor (MIC) 40. The processor 40 controls the sensor 20 such that the usual method of a proximity switch is applicable, as it is known for instance from DE 198 30 981 C1. In this operating mode, the sensor 20 serves to detect the distance between the sensor 20 and the element 2 of the switching part 30 or to detect the position of the switching part 30. The sensor provides a continuous output signal, which is a measure for the distance between the measurement surface of the sensor 20 and the element 2. Preferably, it is provided that the movably guided part 30 is designed such that at least at the predefined positions the output signal of the sensor 20 is changed.

Furthermore, a non-illustrated A-D converter is provided, which converts the output signal of the sensor 20 into digital output values.

Furthermore, an evaluation unit is provided, which compares the digital output values with stored reference thresholds for detecting a position, an error message being produced when the digital output values lie outside admissible reference thresholds.

The microprocessor 40 controls the sensor 20 in a further operating mode such that by changing the frequency and by a corresponding modulation the transponder data can be read out and the transponder 50 can be written. Accordingly, in a second operating mode a communication between the sensor 20 and the transponder 50 can be effected.

This involves, for instance, the advantage that the function of the proximity switch 10 can be checked by means of two different measurement methods. This results in an increase of the safety and the degree of diagnostic coverage, whereby a higher safety class can be achieved.

It is conceivable for instance that the sensor 20 sends a specified signal to the transponder 50 and gets back or reads out a defined signal from the transponder 50. If this identification process is not completed successfully, it can be provided that this is determined in an evaluation unit and an error message is produced.

The transponder 50 can for instance be an inductively acting transponder.

As is also shown in the drawing, the microprocessor 40 is connected with the bus 60. The bus 60 connects the processor 40 with a non-illustrated control unit, which can for instance be designed as central computer.

As shown in the FIG. 1, the proximity switch 10 includes a supply, an additional optical output as well as said bus for connection with a central computer.

Upon mounting the proximity switch 10 at a mounting place, the proximity switch 10 or its sensor 20 detects the transponder 50 and receives information from the same as to the mounting place. Such information is forwarded to the control unit, and parameters such as switching distance, switching threshold, and other functions are then allocated to the proximity switch 10.

The same is true for the allocation of a bus address. Due to the presence of the transponder(s) 50 it is possible to perform an automatic allocation of a bus address upon detection of the transponder 50 by the sensor 20.

A particularly advantageous aspect is obtained when the transponder property is utilized to the effect that collective loads allocated to the part are stored. For this purpose, the transponder memory must be readable and writable. Due to the allocation of the transponder(s) to a movably guided part, for instance the length of a crane jib, it is possible to obtain information on the previous loads, load peaks, etc. of the corresponding component, which can for instance be important when an evaluation of used parts must be made.

Due to the presence of the transponder at the switching part, the present application not only provides for detecting distance and position of the switching part, but also for identifying the same.

Figure 2:
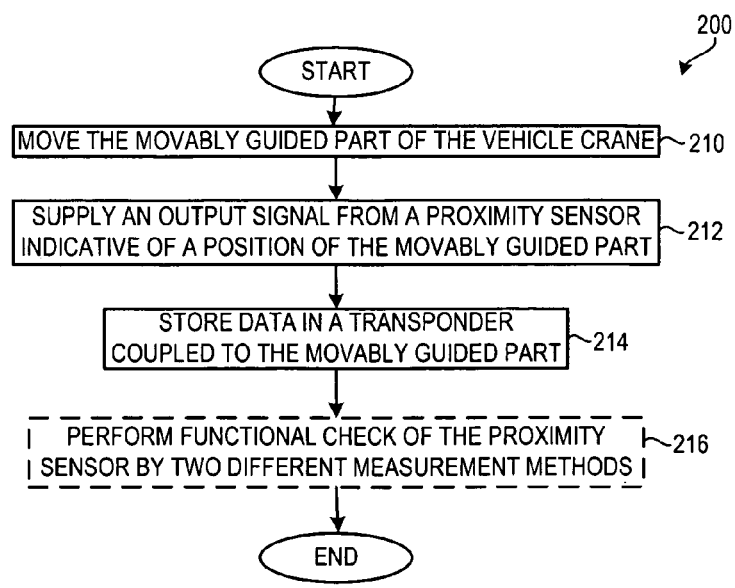

FIG. 2 shows a method 200 for detecting positions of a movably guided part of a vehicle crane. At 210, the method includes moving the movably guided part of the vehicle crane. The movably guided part may be a telescopic jib of the vehicle crane. At 212, the method includes supplying an output signal from a proximity sensor indicative of a position of the movably guided part. At 214, the method includes storing data in a transponder coupled to the movably guided part, where said proximity sensor is configured to read out said data stored in said transponder. The data may include collective loads allocated to the part. At 216, the method may include performing a functional check of the proximity sensor by two different measurement methods.

The invention claimed is:

1. A device for detecting positions of a movably guided part, comprising a proximity sensor which supplies an output signal which is a measure of a distance of an object located in front of the proximity sensor, at least one transponder arranged on the movably guided part, the proximity sensor being designed such that a data stored in the transponder can be read out by the proximity sensor, and further comprising an evaluation unit that is configured to evaluate the output signal of the proximity sensor, which output signal comprises a measure of a distance of an object located in front of the proximity sensor, and at least one transponder signal received by the proximity sensor.

2. The device as claimed in claim 1, wherein the proximity sensor includes an oscillating circuit, and that there is provided a processor controlling the oscillating circuit so that the oscillating circuit can be operated with a first frequency, at which the proximity sensor is used for detecting a position, and with a second frequency, at which the proximity sensor is used for communication with the transponder.

3. The device as claimed in claim 1, wherein the transponder is readable and writable.

4. The device as claimed in claim 1, wherein the transponder is an inductively acting passive transponder.

5. The device as claimed in claim 1, wherein the data stored in the transponder include an identification number, a serial number, quality data, and data concerning a manufacturer of the movably guided part.

6. The device as claimed in claim 1, wherein the data stored in the transponder include data concerning a history of the movably guided part including collective loads allocated to the part.

7. The device as claimed claim 1, wherein the evaluation unit includes a first evaluation unit is provided, which compares output values of the proximity sensor or values derived therefrom with reference values, and that further includes a second evaluation unit is provided, which compares a transponder response signal with a reference signal, an error message being produced when a difference between the output values and the reference values exceeds a limit value or when the transponder response signal does not correspond to the reference signal.

8. The device as claimed in claim 7, wherein the first and second evaluation units are realized by one component.

9. The device as claimed in claim 7, wherein the values derived from the output values of the proximity sensor are digital values, and that an analog-to-digital converter is provided, which converts the output values of the proximity sensor into digital values.

10. The device as claimed in claim 1, wherein a control unit is provided, which is connected with a proximity switch including the proximity sensor.

11. The device as claimed in claim 10, wherein the connection is realized by a bus.

12. The device as claimed in claim 11, wherein the bus address is allocated automatically on the basis of the data stored in the transponder.

13. The device as claimed in claim 12, wherein the proximity switch including the proximity sensor is automatically allocated to a mounting place on the basis of the data stored in the transponder.

14. The device as claimed in claim 1, wherein the transponder is an active transponder.

15. The method of claim 14 wherein said data includes collective loads allocated to the part.

16. A method for detecting positions of a movably guided part of a vehicle crane, the method comprising:
 moving the movably guided part of the vehicle crane;
 supplying an output signal from a proximity sensor indicative of a position of the movably guided part; and
 storing data in a transponder coupled to the movably guided part, where said proximity sensor is configured to read out said data stored in said transponder.

17. The method of claim 16 wherein said movably guided part is a telescopic jib of the vehicle crane.

18. The method of claim 16 further comprising performing a functional check of the proximity sensor by two different measurement methods.

* * * * *